United States Patent Office 3,530,096
Patented Sept. 22, 1970

3,530,096
REDUCTION OF HYDROXYL GROUP CONTENT OF EPOXIDE RESINS
Bryan Dobinson, Duxford, Cambridge, and Eric Whichell Young, Saffron Walden, Essex, England, assignors to Ciba Limited, Basel, Switzerland, a company of Switzerland
No Drawing. Continuation-in-part of application Ser. No. 607,145, Jan. 4, 1967. This application Aug. 11, 1969, Ser. No. 849,209
Claims priority, application Great Britain, Feb. 11, 1966, 6,035/66
Int. Cl. C08g 30/00, 30/04, 30/06
U.S. Cl. 260—47                                  6 Claims

ABSTRACT OF THE DISCLOSURE

The present invention provides a process for reducing the hydroxyl group content of an epoxide resin which comprises reacting a hydroxyl group-containing epoxide resin with a compound of the formula

wherein one of X and Y represents hydrogen and the other represents hydrogen or methyl, and Z represents either a —CN group or a carbalkoxy group containing up to six carbon atoms.

CROSS-REFERENCES TO RELATED APPLICATIONS

This application is a continuation-in-part of the application Ser. No. 607,145, filed Jan. 4, 1967.

BACKGROUND OF THE INVENTION

This invention relates to a process for reducing the hydroxyl group content of epoxide resins, to hardenable compositions containing resins so treated, and to the products obtained by curing such compositions.

It is well known that epoxide resins, i.e. compounds containing on average more than one 1,2-epoxide group per molecule, when prepared by conventional means, generally contain hydroxyl groups, sometimes necessarily formed by the process giving rise to the epoxide resin and sometimes unavoidably formed by partial reaction of the epoxy groups in the resin molecules. For example, the preparation of an epoxide resin by the reaction of a dihydric phenol of formula HO.Z.OH with epichlorohydrin in an alkaline medium may be represented as follows:

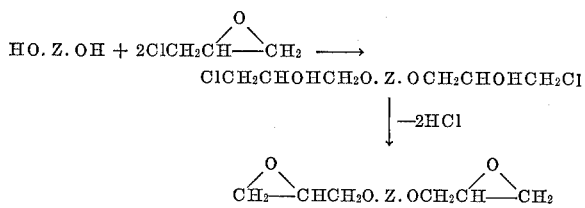

This diglycidyl ether may, however, react with a further molecule of the dihydric phenol thus:

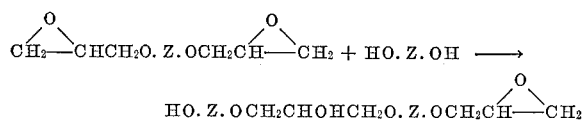

and the terminal phenolic group so produced may react with a further molecule of epichlorohydrin, and the product then undergo dehydrohalogenation as before. It will be seen that the final product may be represented by the average formula:

where $p$ may not be zero, but may be, for example, within the range 0.5 to 2, in which case the product necessarily contains hydroxyl groups.

The hydroxyl content of commercially-available epoxide resins is often quite high. For example, the well known epoxide resins prepared from bisphenol A (2,2-bis(p-hydroxyphenyl)propane) and epichlorohydrin usually contain, if liquid at room temperature, from about 0.3 to 1 gram-equivalent of hydroxyl groups per kg., or, if melting at about 40 to 60° C., about 1.15 to 2.3 gram-equivalent per kg. Such resins may also contain chlorohydrin groups.

Epoxide resins are also produced by the reaction of acyclic or cyclic compounds containing two or more ethylenic bonds with an epoxidizing agent, generally an organic percarboxylic acid. Such resins ordinarily contain a proportion of hydroxyl groups arising from practically unavoidable solvolysis of the epoxide groups.

While in many cases the presence of hydroxyl groups in an epoxide resin is acceptable or sometimes even desirable, it is sometimes preferable to employ an epoxide resin which is substantially free from hydroxyl groups. It has been found, for example, that the maximum temperature attained under the normal conditions of hardening by a mixture of a hydroxyl group-containing epoxide resin which has been modified to render it substantially free from hydroxyl groups and an amine curing agent, is considerably less than that attained during the hardening under similar conditions of the unmodified resin, and less even than the maximum temperature attained during hardening under similar conditions of an unmodified hydroxyl group-containing resin of the same initial epoxide group content as the modified resin. Reduction in the maximum temperature attained is desirable so that the mixture undergoing cure should not attain a temperature so high that stresses occur within the cured product so severe as to cause formation of cracks and possible damage to components being encapsulated in the resin mixture. Further, compositions comprising epoxide resins which are substantially free from hydroxyl groups, and either a catalytic hardener or an unaccelerated polycarboxylic acid anhydride hardener, have longer pot-lives.

It has been proposed to prepare hydroxyl group-free epoxide resins by fractional distillation under reduced pressure of the crude resin. This process is, however, inconvenient and requires relatively expensive high vacuum equipment. Further, when applied to the reaction product of bisphenol A and epichlorohydrin, this process gives the substantially pure diglycidyl ether of bisphenol A, which undesirably is liable to crystallise on standing at room temperature. The reaction between this purified resin and an amine curing agent is strongly exothermic, due to the high density of cross-linking.

It has now been found that the hydroxyl group content of epoxide resins may be substantially reduced by reaction of the hydroxyl groups with certain α,β-unsaturated compounds without, however, causing substantial destruction of the epoxide groups. As will become apparent, a slight decrease in epoxide content per unit weight of the treated epoxide resin occurs, because the hydrogen atoms of the hydroxyl groups are replaced by organic substituents. However, with routine safeguards side-reactions which might otherwise result in destruction of the epoxide groups occur only to a slight extent and the treated resin can be readily cured.

The present invention accordingly provides a process for reducing the hydroxyl group content of an epoxide resin which comprises reacting a hydroxyl group-containing epoxide resin with a compound of the formula

wherein one of X and Y represents hydrogen and the other represents hydrogen or methyl, and Z represents either a —CN group or a carbalkoxy group containing up to six carbon atoms.

Also within the scope of the present invention are hardenable compositions containing an epoxide resin treated according to the aforesaid new process and a curing agent therefor, and hardened compositions obtained from such compositions.

Examples of compounds of the Formula I which may be used in the process of the present invention are arylonitrile, methacrylonitrile, crotononitrile, methyl acrylate, ethyl acrylate, and methyl methacrylate, the use of acrylonitrile being particularly preferred.

Reaction between the hydroxyl groups of the epoxide resin and the unsaturated compound of Formula I is considered to involve a Michael addition of the hydroxyl group-containing epoxide resin (which can be represented by the formula ROH) to the ethylenic double bond of the compound of Formula I:

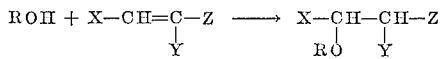

This addition is base-catalysed, and the reaction is therefore carried out in the presence of a small amount of a basic catalyst. Preferred catalysts are alkali metal alkoxides, such as sodium methoxide, tertiary amines, such as pyridine, and quaternary ammonium hydroxides, such as benzyltrimethylammonium hydroxide. If such a base is present in too large a proportion, some destruction of the epoxide groups might occur through polymerisation: also, the unsaturated compound of Formula I may polymerise to a substantial extent.

The proportion of basic catalyst to be used depends on a number of factors.

As already explained, an epoxide resin is often prepared by treating the corresponding chlorohydrin with a basic substance. This cyclisation does not always proceed to completion: frequently, a small proportion of chlorohydrin groups is present, so that, when a base is added to promote reaction with the unsaturated compound of Formula I, some of this base may be consumed in converting residual chlorohydrin groups into epoxide groups. Allowance should be made, in the quantity of catalyst taken, if a significant content of chlorohydrin groups is present. The chlorohydrin group content can readily be determined in a known manner, such as by tritration against methanolic sodium methoxide solution.

Other factors which determine the optimum range of proportion of catalyst are the basicity of the catalyst and the molecular weights of the reactants. Usually, about 0.1% to 1%, and preferably 0.2% to 0.6%, by weight of basic catalyst is added, calculated on the weight of the epoxide resin treated. The rate of decrease in hydroxyl group content of the epoxide resin can readily be followed in a routine manner by taking a small sample of the reaction mixture, removing any solvent, and inspecting the infra-red spectrum of the sample. If the extent of decrease in hydroxyl group content is inadequate, more of the catalyst or of the compound of Formula I is added as necessary.

Because any residual basic catalyst may induce destruction of the epoxide groups through polymerisation, it is advisable to neutralise the catalyst when the reaction has been completed.

The proportion of the compound of Formula I employed may also vary widely. If it is desired to produce an epoxide resin of moderate activity, i.e., one still containing a significant proportion of hydroxyl groups, then less than the quantity of the compound of Formula I for complete reaction is employed. In most cases, however, at least enough the compound of Formula I is taken to react with all the hydroxyl groups of the epoxide resin, and preferably a comparatively large excess over the stoichiometric amount is employed to facilitate completion of the reaction. Thus, from 3 to 20, especially 5 to 15, moles of the compound of Formula I may be taken per hydroxyl group equivalent of epoxide resin. Preferably a compound of Formula I more volatile than the epoxide resin to be treated is employed, so that any unreacted excess of the compound of Formula I may be distilled from the treated epoxide resin and then reused if desired.

The compounds of Formula I are, in general, liquids of low viscosity, so that an excess can serve as solvent for the resin treated. Preferably, however, an inert solvent, i.e. a hydroxyl-free aprotic liquid which does not react with the other components of the reaction mixture under the conditions used, such as toluene or xylene, is also added to the reaction mixture. Such an addition reduces the tendency to polymerise of any unreacted unsaturated compound of Formula I.

If desired, the reaction mixture may also contain a further substance which retards or inhibits polymerisation of the compound of Formula I.

The reaction is usually carried out at a temperature in the range of 40° to 120° C., especially 60° to 100° C. Normally, the reactants are heated together under atmospheric pressure: the reaction can also be carried out under increased pressure, or under subatmospheric pressure, but ordinarily there is no advantage in this.

Epoxide resins containing hydroxyl groups which may be treated by the new process include, for example, polyglycidyl esters obtainable by the reaction of a di- or polycarboxylic acid with epichlorohydrin or glycerol dichlorohydrin in the presence of an alkali. Such polyglycidyl esters may be derived from aliphatic dicarboxylic acids, e.g. oxalic acid, succinic acid, glutaric acid, adipic acid, pimelic acid, suberic acid, azelaic acid, sebacic acid, or dimerised or trimerised lineolic acid, and from aromatic dicarboxylic acids such as phthalic acid, isophthalic acid, terephthalic acid, naphthalene-2,6-dicarboxylic acid, diphenyl-2,2' - dicarboxylic acid and ethylene glycol bis-(4-carboxyphenyl ether). Specifically such polyglycidyl esters are, for example, diglycidyl adipate and those diglycidyl esters which correspond to the average formula:

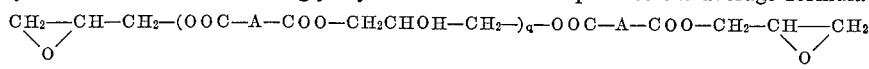

in which A represents a divalent aromatic hydrocarbon radical, such as a phenylene group, and $q$ represents a small positive whole or fractional number.

Further examples of epoxide resins which may be treated by the process of this invention are the polyglycidyl ethers obtainable by the interaction of a dihydric or polyhydric alcohol or a dihydric or polyhydric phenol with epichlorohydrin or a related substance (for example, glycerol dichlorohydrin) under alkaline conditions or, alternatively, in the presence of an acidic catalyst with subsequent treatment with alkali. These compounds may be derived from diols or polyols, such as ethylene glycol, diethylene glycol, triethylene glycol, propane-1,2-diol, propane-1,3-diol, butane-1,4-diol, pentane-1,5-diol, hexane-1,6-diol, hexane-2,4,6-triol, glycerol or N-aryldialkanolamines such as N-phenyldiethanolamine, and are preferably derived from dihydric or polyhydric phenols such as resorcinol, catechol, hydroquinone, 1,4-dihydroxynaphthalene, 1,5-dihydroxynaphthalene, bis(4-hydroxyphenyl)-methane, bis(4-hydroxyphenyl)methylphenylmethane, bis(4 - hydroxyphenyl)-tolylmethanes, 4,4'-dihydroxydiphenyl, bis(4-hydroxyphenyl)sulphone and especially 2,2-bis(4-hydroxyphenyl)propane or phenol-formaldehyde condensation products.

Aminopolyepoxides may similarly be employed such as are, for example, obtained by the dehydrohalogenation of the reaction products of epihalohydrins and primary or disecondary amines such as aniline, n-butylamine, bis(4-methylaminophenyl) methane, or bis(4-methylaminophenyl) methane and epoxide resins obtained by the epoxidation of cyclic and acyclic polyolefins, such as vinylcyclohexene dioxide, limonene dioxide, dicyclopentadiene dioxide, 3,4 - epoxydihydrodicyclopentadienyl glycidyl ether, the bis(3,4-epoxydihydrodicyclopentadienyl)ether of ethylene glycol, 3,4-epoxycyclohexylmethyl 3′,4′-epoxycyclohexanecarboxylate and its 6,6′-dimethyl derivative, the bis(3,4 - epoxycyclohexanecarboxylate) of ethylene glycol, the acetal formed between 3,4 - epoxycyclohexanecarboxyaldehyde and 1,1 - bis(hydroxymethyl)-3,4-epoxycyclohexane, and epoxidized butadienes or copolymers of polybutadienes with ethylenic compounds such as styrene and vinyl acetate.

Examples of curing agents which may be used in the compositions of the invention include those conventionally employed as cross-linking agents for epoxide resins, for example, amines containing at least two hydrogen atoms directly attached to nitrogen, e.g. aliphatic and aromatic primary and secondary amines such as butylamine, p-phenylenediamine, bis(p-aminophenyl)methane, ethylenediamine, N,N′-diethylethylenediamine, diethylenetriamine, di(hydroxyethyl)diethylenetriamine, triethylenetetramine, tetraethylenepentamine, guanidine derivatives, such as phenylguanidine and diphenylguanidine, dicyandiamide, aniline-formaldehyde resins, polymers of aminostyrenes, and polyaminoamides, e.g. those prepared from aliphatic polyamines and dimerised or trimerised unsaturated fatty acids; isocyanates and isothiocyanates; polyhydric phenols, e.g. resorcinol, hydroquinone, 2,2-bis(4-hydroxyphenyl) propane, phenol-aldehyde resins and oil-modified phenol-aldehyde resins; reaction products of aluminium alkoxides or phenolates with tautomeric-reacting compounds of the acetoacetic ester type; Friedel-Crafts catalysts, e.g. $AlCl_3$, $SnCl_4$, $ZnCl_2$, $BF_3$, and their complexes with organic compounds; phosphoric acid; and polycarboxylic acids and their anhydrides, e.g. phthalic anhydride, methylendomethylene - tetrahydrophthalic anhydride, dodecenylsuccinic anhydride, hexahydrophthalic anhydride, hexachloroendomethylenetetrahydrophthalic anhydrides and endomethylenetetrahydrophthalic anhydride, and their mixtures, pyromellitic dianhydride, and maleic and succinic anhydrides.

Catalytic hardeners may also be used, e.g. tertiary amines such as 2,4,6-tris(dimethylaminomethyl)phenol, triethanolamine, and N-benzyldimethylamine; alkali metal alkoxides of alcohols such as 2,4-dihydroxy-3-hydroxymethylpentane; stannous salts of alkanoic acids, such as stannous octoate; aluminium alkoxides; and triphenylphosphine.

The compositions of the present invention may also contain reactive diluents such as phenylglycidyl ether. If desired, hydroxyl-group containing materials may be added to the modified resins in proportions such that there are obtained resins having reactivities intermediate between that of the unmodified resin and that of the modified resin substantially free from hydroxyl groups. They may also contain fillers, plasticisers, and colouring agents, for example, kaolin, asphalt, bitumen, glass fibres, mica, quartz powder, cellulose, finely-divided silica (such as that available under the registered trademark "Aerosil"), or metal powder. The aforesaid compositions may be used as dipping, casting, potting, encapsulating, coating or adhesive resins.

The following examples illustrate the invention. Deflection temperatures of the cured products were determined according to ASTM Specification D648–56. Unless otherwise indicated, epoxide contents were determined by modification of the procedure described by Jay (Analytical Chemistry, 1964, 36, 667–8), the tetraethylammonium bromide being added as a solid instead of dissolved in glacial acetic acid, since the solution is not stable on storage.

EXAMPLE I

The epoxide resin employed was prepared in a conventional manner by the reaction of bisphenol A with epichlorohydrin in the presence of sodium hydroxide, and had the following characteristics: epoxide content, as determined by titration with HBr in glacial acetic acid, 5.22 equiv./kg.; chlorohydrin content, as determined by titration with methanolic sodium methoxide, 0.09 equiv./kg.; hydroxyl-group content, as estimated from the infra-red spectrum, 0.6 equiv./kg.; viscosity at 21° C., 238 poises.

A solution of this resin (1000 g.) in xylene (1000 ml.) was heated to 60° C. and treated successively with a 2 N sodium methoxide solution in methanol (40 ml.) and acrylonitrile (500 ml.). An exothermic reaction occurred during the first stage of adding the acrylonitrile. The mixture was stirred at 60° C. for 4 hours. Carbon dioxide was bubbled through the mixture, after it had been cooled to room temperature, for 15 minutes to neutralise residual catalyst. The mixture was filtered, the filtrate heated to 120° C. under 14 mm. pressure, and then extracted into chloroform. After washing the extract with water and distilling off the solvent, there remained a resin having the following characteristics: epoxide content, as determined by titration with HBr in glacial acetic acid, 4.94 equiv../kg.; chlorohydrin content, 0.02 equiv./kg.; hydroxyl-group content, less than 0.1 equiv./kg.; viscosity at 21° C., 186 poises. The decrease in epoxide content can be attributed to the increase in molecular weight caused by introduction of the cyanoethyl group.

EXAMPLE II

A hydroxyl-group containing epoxide resin, prepared as indicated in Example I and having an epoxide content of 5.27 equiv./kg. (1000 g.), dry toluene (500 ml.) and acrylonitrile (500 ml.) were stirred together at 21° C. An approximately 4 N methanolic solution of sodium methoxide (20 ml.) was added dropwise over 15 minutes, the temperature of the mixture rising to 24° C. and continuing to rise over a further 15 minutes to 25° C. The mixture was heated to 90° C. for 10 minutes, and then cooled. To remove volatile materials, the pressure was reduced to 14 mm. and the temperature of the mixture was slowly raised to 120° C. The residue was taken up in toluene (100 ml.), stirred with a solution of glacial acetic acid (5 ml.) in toluene (100 ml.) for 15 minutes at room temperature, and then washed with water (3×500 ml.). The resin remaining on heating the washed product to 100° C. at 0.5 mm. pressure had, as indicated by its infra-red spectrum, a substantially reduced content of hydroxyl groups.

EXAMPLE III

A hydroxyl group-containing epoxide resin, prepared as indicated in Example I and having an epoxide content of 5.34 equiv./kg., (100 g.) ethyl acrylate (40 ml.) (stabilised with a small amount of a polymerisation inhibitor), and toluene (50 ml.) were stirred together at room temperature. To this mixture was added approximately 4 N methanolic sodium methoxide solution (2 ml.), the temperature of the mixture rising from 20° C. to 25° C. over 30 minutes. The mixture was stirred for a further 30 minutes, and then heated to 90° C. for 10 minutes. Carbon dioxide gas was bubbled through the cooled mixture, and the mixture was then heated to 120° C. under 0.5 mm. pressure. The residual product had an epoxide content of 5.19 equiv./kg., and, as shown by its infra-red spectrum, a reduced content of hydroxyl groups.

EXAMPLE IV

A mixture was prepared comprising 100 parts of the modified epoxide resin prepared as described in Example I, triethylenetetramine (11 parts) and dibutyl phthalate (20 parts). A 100 g. sample of the mixture, kept in a vacuum-jacketed flask at 21° C., spontaneously heated itself to a peak temperature of 151° C. after 80 minutes. A 100 g. sample of a mixture comprising 100 parts of the unmodified epoxide resin used in Example I, 12 parts of triethylenetetramine (the higher proportion of curing agent corresponding to the higher epoxide content of the unmodified resin) and 20 parts of dibutyl phthalate, spontaneously heated itself, when kept under similar conditions, to a peak temperature of 174° C. after 56 minutes.

In a comparative experiment there was used a carefully-purified fraction of a polyglycidyl ether of bisphenol A. This fraction had the following characteristics: epoxide content as determined by titration with HBr in glacial acetic acid, 5.78 equiv./kg. (calculated content for bisphenol A diglycidyl ether, 5.88 equiv./kg.); chlorohydrin content, as determined by titration with methanolic sodium methoxide, 0.03 equiv./kg.; hydroxyl-group content, as estimated from the infra-red spectrum, less than 0.05 equiv./kg. At room temperature, it consisted of moist crystals. A 100 g. sample of a mixture comprising 100 parts of this purified fraction, a proportionate amount of triethylenetetramine (13 parts) and 20 parts of dibutyl phthalate, kept under similar conditions, attained a peak temperature of 197° C. after 71 minutes.

EXAMPLE V

Three mixtures were prepared comprising, respectively, 100 parts of the modified epoxide resin prepared as described in Example I with 25 parts of 4,4'-diaminodiphenylmethane, 100 parts of the unmodified epoxide resin used in Example I with 27 parts of 4,4'-diaminodiphenylmethane, and 100 parts of the purified fraction of epoxide resin as used in Example IV with 30 parts of 4,4'-diaminodiphenylmethane. The temperatures of 100 g. samples of the mixtures, heated to 70° C. and placed in vacuum-jacketed flasks, rose to respective maxima of 215° C. (after 100 minutes), 224° C. (after 40 minutes), and 230° C. (after 65 minutes). The ultimate deflection temperatures of the sample of the mixtures, on curing at 140° C., were 145° C., 156° C. and 154° C., respectively.

What is claimed is:

1. Process for lowering the hydroxyl group content of an epoxide resin which comprises reacting in the presence of a small amount of a basic catalyst a hydroxyl group-containing epoxide resin with a compound of the formula

wherein one of X and Y represents hydrogen and the other represents a member selected from the group consisting of hydrogen and methyl, and Z represents a member selected from the group consisting of the —CN group and the group

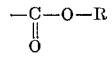

where R is alkyl with 1 to 5 carbon atoms.

2. Process according to claim 1, wherein the compound of Formula I is acrylonitrile.

3. Process according to claim 1, wherein the compound of Formula I is selected from the group consisting of methyl acrylate, ethyl acrylate and methyl methacrylate.

4. Process according to claim 1, wherein the basic catalyst is a member selected from the group consisting of alkali metal alkoxides, tertiary amines, and quaternary ammonium hydroxides.

5. Process according to claim 1, wherein the compound of Formula I used is more volatile than the epoxide resin and is employed in amount in excess of that required to react with all the hydroxyl groups, and the excess of the said compound of Formula I is distilled from the treated epoxide resin at the end of the reaction.

6. Process according to claim 1, wherein the reaction is carried out in the presence of an inert solvent.

References Cited

UNITED STATES PATENTS 3,438,911   4/1969   Dobinson _____ 260—2

WILLIAM H. SHORT, Primary Examiner

E. H. NIELSEN, Assistant Examiner

U.S. Cl. X.R.

260—2, 348